3,092,552
OLIGODYNAMIC SILVER COMPOSITIONS
AND USES
Isabella B. Romans, New York, N.Y., assignor of fifteen percent to Albert C. Nolte, New York, N.Y.
No Drawing. Filed May 19, 1958, Ser. No. 735,919
29 Claims. (Cl. 167—72)

This invention relates to compositions and articles having at least antimicrobic effects, to a method of preparing such compositions, and to a process of treating articles so that they will have such effects.

This application is a continuation-in-part application Serial No. 45,442, filed August 20, 1948, now Patent No. 2,653,893; application Serial No. 138,259, filed January 12, 1950, now abandoned; application Serial No. 407,171, filed January 29, 1954, now abandoned; and application Serial No. 507,985, filed May 12, 1955, now abandoned.

Certain metals have so-called oligodynamic effect (i.e., germicidal or antiseptic effect) in minute quantities of said metals, when brought into contact with germ-containing liquids and substances. Silver is best suited as an oligodynamic material.

In accordance with certain features of the present invention, silver in the ionic state is employed as the active oligodynamic agent, and serves either as the basis of a new therapeutic or surface-treating composition, or as effective means for germicidally protecting an article or surface treated by said ionic silver. The silver has a greater tendency to enter a contaminated solution and to be more active germicidally when in ionic state than when in metallic elemental state. For that reason, the oligodynamic treating solution of silver is so dilute that almost all of the silver is in the ionic state. When the maximum amount of silver ions have been adsorbed from an aqueous solution by an inert surface, such as glass, wood, cellophane or other such materials, these are removed from the oligodynamic treating solution. When this surface comes into contact with contaminated solutions or substances, the silver ions go into the new solution and exert a germicidal or antiseptic effect.

Another feature of the present invention is that in preparing a new and improved oligodynamic silver composition, a low concentration of a silver compound is reduced by a deoxidizing agent, such as starches, sugars, glycerine, polyethylene glycols and urea. The use of a deoxidizing agent, as described, causes more oligodynamic silver to be produced. Starches from a variety of sources may be used for the present purposes, e.g., corn starch, potato starch, rice starch, tapioca starch, wheat starch, etc. Likewise, a variety of reducing sugars, e.g., (monosaccharides) dextrose, fructose, mannose, galactose, etc., as well as certain disaccharides, e.g., maltose and lactose, may be used as the deoxidizing agent of this invention.

Sugars, glycerine and the like reduce silver compounds, but do not always prevent discoloration of the product. I have found that the addition of small amounts of sodium chloride and/or cupric chloride can prevent discoloration of ointment, cellophane, gauze, etc., even when the product is exposed to sterilizing procedures and direct sunlight.

An effective composition for therapeutic use or surface-treating compositions can be made from silver compounds, such as silver nitrate and silver oxide. I have found that these compounds can be made more germicidally active when small amounts of substances or compounds containing other metal ions such as copper and/or zinc are present. The presence of these other metal ions appears to increase the availability of oligodynamic silver, stabilize it, and make it more selective in its germicidal activity by reducing the inhibiting effect of organic materials that might be present in a material or solution to be treated. The oxides of the metals may be used, but copper in the form of copper nitrate, and zinc in the form of zinc nitrate, are especially effective for this purpose.

As noted above, copper in the form of copper nitrate, and zinc in the form of zinc nitrate, are especially effective in increasing the availability of oligodynamic silver. These may be used individually or together. The quantity of these materials in the composition may vary. However, it is preferable that the quantity of copper or zinc or a combination of the two present in the composition be no more than twice the amount of the silver employed.

Another feature of this invention is the inclusion of nitric acid in the composition. Nitric acid serves to stabilize stock solutions and other solutions containing the oligodynamic silver composition of this invention.

I have found that oligodynamic silver in amounts of 0.000001% to 5.0% by weight is effective for the purposes indicated, although concentrations of 0.01% to 5.0% are especially effective in ointments and skin antiseptics, and more specifically a concentration of about 0.05%. In aqueous solutions the effective range is much lower, from 1.0 to .001 p.p.m. The amount of reducing agent should be sufficient to reduce the silver compound in dilute ionic solution to oligodynamic silver.

A stock solution, referred to hereinafter as stock solution A, can be produced which can be further diluted or modified for specific applications. This stock solution, in a specific example, is as follows:

STOCK SOLUTION A

| | |
|---|---|
| Silver nitrate | grams__ 14.0 |
| Dextrose, USP | do____ 14.0 |
| Cupric nitrate | do____ 14.0 |
| Zinc nitrate | do____ 14.0 |
| Nitric acid | ml__ 2.0 |

To 100 ml. with distilled water.

This is a true solution and remains stable even in the presence of direct sunlight. It can be sold as a stock solution used for the preparation of pharmaceutical products, such as antiseptic collyrium, sanitizing agent, antiseptic hand lotion, etc. and for many other uses to be described.

STOCK SOLUTION B

| | |
|---|---|
| Silver nitrate | grams__ 14.0 |
| Dextrose, USP | do____ 14.0 |
| Cupric nitrate | do____ 14.0 |
| Nitric acid | ml__ 2.0 |

To 100 ml. with distilled water.

This is also a true solution and may be used in a manner similar to stock solution A described above.

PHARMACEUTICAL PRODUCTS

A. *Antiseptic Collyrium*

For the preparation of antiseptic collyrium, glycerine is added to aqueous solutions of the stock solution A. The glycerine reduces the surface tension of the solution, enabling it to penetrate more readily into all areas of the ophthalmic region. It also assists in rinsing out the silver chloride precipitated when the solution is used to irrigate irritated eyes. Because of the possible precipitation of silver chloride, this solution is more desirable for use as eye wash or irrigation than as eye drops.

The following example of a specific formulation is effective in the relief of irritated eyes and especially those irritated as a result of the use of contact lenses:

| | Percent |
|---|---|
| Stock solution A | 0.065 |
| Glycerine, USP | 5.000 |
| Distilled water | 94.934 |

Since there are traces of chlorides in most glycerine, it can precipitate silver chloride, if it is added in concentrated solution. Therefore, it is best to add stock solution A to one-half the distilled water used and glycerine to the other half, and then mix the two solutions.

B. Skin Antiseptic

A wetting agent can be added to the stock solution A to facilitate the wetting of the skin. The solution so modified, can sterilize the skin and leave a residue of adsorbed oligodynamic silver on the skin which is at least bacteriostatic. The presence of this adsorbed silver can be demonstrated by the application of photographic developer and spectrographic analysis. The following formulation for a solution containing 0.04% silver is an effective skin antiseptic.

| | Percent |
|---|---|
| Stock solution A | 0.54 |
| Triton X-100 (10%) (Rohm & Haas Co.) alkylated aryl polyether alcohol, as wetting agent | 0.80 |
| Distilled water | 98.36 |

The solution of this formulation is useful, as, for example, in preparation of skin before surgical operations.

When used as a sanitizing agent for wiping tables, sterilizing workers' hands, etc., as, for example, in restaurants and the like, one part of the solution of this formulation can be diluted with ten parts of tap water. This diluted solution containing 0.004% silver can effectively sterilize the hands and the cloth used in wiping tables and the like.

I have also found that skin and hair will adsorb oligodynamic silver from an aqueous solution containing silver nitrate, cupric nitrate and a deoxidizing agent. The following formulation is suitable for this purpose:

| | | |
|---|---|---|
| Silver nitrate | gram | 0.07 |
| Cupric nitrate | do | 0.07 |
| Dextrose, USP | do | 0.07 |
| Glycerine | ml | 5.0 |

To 100 ml. with distilled water.

When this solution is diluted to one part in ten parts distilled water it can be used effectively as an eye wash for the treatment of irritated or infected eyes. Its use has been found especially effective in reducing irritation caused by wearing contact lenses.

This composition is a more effective skin antiseptic when Triton X-100 or a similar wetting agent is used to replace glycerine as a surface-active agent because it causes the skin to wet more easily and thoroughly and thus makes the germicide more readily available.

C. Antiseptic Hand Lotion

Another formulation which is effective as an antiseptic hand lotion is as follows:

| | Percent |
|---|---|
| Stock solution A | 0.8 |
| Carbowax 4000 | 27.5 |
| Carbowax 1500 | 2.5 |
| Polyethylene glycol | 9.0 |
| Triton X-100 (10%) | 1.2 |
| Distilled water | 59.0 |

The polyethylene glycol in the above formulation is a liquid having an average molecular weight of about 300. "Carbowax 4000" are polyethylene glycols in the form of a wax-like solid sold by Carbide and Carbon Chemical Corp. and having different molecular weights with an average molecular weight of 4000, and "Carbowax 1500" is a blend of polyethylene glycols in wax-like solid form having an average molecular weight of between 500 and 600. The "Carbowaxes" and polyethylene glycol used in the above formulation are water-soluble.

The latter formulation described is effective as a pre-operative skin lotion for the hands of surgeons, nurses and their assistants. After washing hands and arms to remove gross soil, the lotion is applied and rubbed into the skin for from two to three minutes. The excess is then removed by rinsing in water. This treatment not only degerms the skin but leaves an active residue thereon which controls subsequent contamination.

D. Antiseptic Ointment

Another pharmaceutical material which does not necessarily use the stock solution A directly but which employs at least the essence thereof, is an antiseptic ointment. This ointment has as a water-soluble base a composition comprising "Carbowax 4000," "Carbowax 1500," polyethylene glycol 300, lanolin, beeswax and water, and the essence of the stock solution is incorporated in this water-soluble base to produce an antiseptic ointment which is effective for the treatment of wounds, burns, etc. The following is an example of an ointment useful for this purpose:

| | Percent |
|---|---|
| Silver nitrate, C.P. | 1.0 |
| "Carbowax 4000" | 55.0 |
| Polyethylene glycol (molecular weight 300) | 18.0 |
| "Carbowax 1500" | 5.0 |
| Corn starch, USP | 0.2 |
| Cupric nitrate (purified) | 0.2 |
| Sodium chloride, C.P. | 1.0 |
| Lanolin anhydrous | 8.0 |
| Beeswax | 2.0 |
| Distilled water | 12.6 |

This ointment can be prepared by heating the "Carbowaxes," polyethylene glycol and ⅓ of the water, until the Carbowaxes are melted. This mixture is cooled and silver nitrate and cupric nitrate in ⅓ of the water are added. Later, the starch and sodium chloride in the remaining ⅓ water are added and finally, after the mixture has started to solidify, the lanolin and beeswax are added. The mixture is stirred continuously throughout the above procedure.

As already indicated in connection with the formulation for the hand lotion, the polyethylene glycol and the "Carbowaxes" in the formulation for the antiseptic ointment are water-soluble, unctuous compounds and are blended in this ointment to form a solid plastic base which melts at body temperature. The polyethylene glycol 300 and the Carbowax 4000 and 1500 in this formulation are oxidizable compounds and therefore serve as reducing agents for the silver compound in dilute ionic solution, to produce ionic and/or a form of silver that is less irritating and has more oligodynamic activity than the original compound.

The lanolin and beeswax in the above formulation for the ointment are insoluble in the ointment mixture and are useful in preventing dressings from sticking to wounds. However, the entire mixture is sufficiently soluble in water, so that it can be removed easily by washing. If a completely water-soluble ointment is desired, these water-insoluble ingredients may be omitted without reducing the antibacterial effect of this ointment.

In the above formulation for the ointment, the small amount of a compound containing a metal other than silver added to the mixture, increases the oligodynamic activity of the ionic silver in said mixture. Copper nitrate and/or zinc nitrate or other source of copper or zinc ions, such as cupric chloride, and/or sodium chloride, has been found especially suitable for the purpose. I have also found that as litle as 0.01% sodium chloride increases the solubility of silver probably by the formation of complex silver salts, such as AgNaCl and the like. This increases germicidal activity and prevents discoloration of the product.

I have also found that the following base is suitable for ointments for use on infected burns:

| | Percent |
|---|---|
| "Carbowax 4000" | About 55 |
| Polyethylene glycol 300 | do____ 15 |
| "Carbowax 1500" | do____ 5 |
| Water | do____ 15 |
| Lanolin | do____ 8 |
| Beeswax | do____ 2 |

If desired, Vaseline (a purified mixture of semi-solid hydrocarbons, chiefly of the methane series of the general formula $C_nH_{2n+2}$) and Aquaphor (a proprietary skin detergent ointment containing hydroxyl animal fats) may be used in place of lanolin and beeswax, but they are not as effective. The above ointment base mixture is not germicidal, but when sufficient silver compound, and particularly silver oxide, or silver nitrate, is added to give a low concentration of about .001% to 5.0% it becomes germicidal. In a similar manner, as described above, a small amount of a compound containing a metal other than silver increases the oligodynamic activity of the mixture described above. Thus, cupric nitrate, cupric chloride and/or sodium chloride is suitable for use. Similarly, as little as 0.01% sodium chloride will serve as well in this composition for the purposes indicated, but will also serve to prevent discoloration of the ointment.

The following formulation is a further illustration of an ointment embodied in the present invention:

| | Grams |
|---|---|
| "Carbowax 4000" | 275 |
| Polyethylene glycol 300 | 75 |
| "Carbowax 1500" | 25 |
| Water | 75 |
| Cupric nitrate | 0.1 |
| Silver nitrate | 0.45 |
| Sodium chloride | 0.50 |
| Cornstarch, USP | 1.00 |
| Lanolin, USP | 40.00 |
| Beeswax | 10.00 |

In the preparation of the ointment described in the above formulation, the "Carbowaxes," polyethylene glycol and 35 cc. of water are heated until the "Carbowaxes" are melted. The mixture is cooled and silver nitrate and cupric nitrate in 20 cc. of water are added. Later the starch and sodium chloride in the remaining 20 cc. of water are added and finally after the mixture has started to solidify, the melted lanolin and beeswax are added. The mixture is stirred throughout the above procedure.

The ointment made in accordance with the principle of the invention described, is effective against pathogenic organisms such as *Micrococcus pyogenes* var. *aureus, Pseudomonas pyocyaneus, Escherichia coli, Streptococcus mitus*, etc. An outstanding feature of this ointment is that it is effective against both Gram-positive and Gram-negative organisms, especially *Pseudomonas pyocyaneus*. Few of the chemicals and antibiotics in use at the present time are effective against all these organisms. The antibacterial effect of this ointment is not materially affected by skin, serum or blood.

The solution of the present invention can also be effectively employed to treat cellulosic materials to produce antiseptic gauze, antiseptic diapers (cloth and disposable paper), sterilized paper cups, etc.

CELLULOSIC MATERIALS

A. *Antiseptic Gauze*

Antiseptic gauze can be prepared by immersing surgical gauze in a 0.1% aqueous solution of the Stock Solution A for two minutes, passing it through a wringer, and then treating the gauze with a 0.2% solution of cupric chloride or sodium chloride. Gauze so treated is antiseptic and can be exposed to sunlight and placed in autoclave for thirty minutes at twenty pounds pressure, without affecting its germicidal activity or discoloring it. The zones of inhibition of various pathogenic organisms produced by this gauze are not materially affected by the presence of serum, blood or urine. Treated gauze saturated with discharge of pus and blood from infected wounds becomes sterile in less than twenty-two hours.

B. *Antiseptic Diapers*

An oligodynamic silver solution of the type described can be effectively used to treat paper pulp for antiseptic disposable diapers. In preparing such diapers, pulp after being treated is enclosed in non-woven fabric to form a sheet which is backed with polyethylene and then cut into sections to produce diapers. More specifically, antiseptic disposable diapers may be prepared from paper board (paper fibers compressed to produce a board of about ¼" thickness) by passing this board through two rollers, one of which is immersed in an oligodynamic silver solution containing about 0.04% silver and prepared from the Stock Solution A. The speed of the rollers, depth of solution, etc., are adjusted, so that the paper board picks up enough solution to give a final concentration of 0.025% silver. Distribution of the silver through the paper board will be uniform, this being demonstrated by the color developed, when large sections are immersed in a solution of MQ photographic developer. The paper board is then dried and ground into an absorbent fluffy mass which is deposited between long strips of non-woven fabric. Then one side of the resulting sheet is coated with polyethylene, the sheet cut into sections and the ends of these sections sealed to form diapers. The method for making such disposable diapers, but without antiseptic, is covered by the Crane Patent No. 2,560,332.

Antiseptic diapers prepared as described can be effectively employed on babies.

C. *Cotton and Woolen Fabrics*

Cotton fabrics, such as diapers, sheets, clothes, etc., and woolen fabrics, such as blankets, clothes, etc., can be treated while being laundered, by adding oligodynamic silver solution prepared along the general lines of the Stock Solution A to the rinse water in the laundry wheel.

D. *Antibacterial Paper*

Antibacterial paper can be prepared by the addition of an oligodynamic silver solution prepared along the general lines of the Stock Solution A to the fibers while they are in the beater. The residual silver remaining in the "white water" would remove slime and other biological growth from the water system of the paper mill.

E. *Paper Cups and Other Containers*

Paper cups and other containers can be rendered antiseptic by rinsing the cups and containers with a dilute solution of the silver compound, a reducing agent of the general type described, and a substance having a metal of the class consisting of copper, zinc sodium, potassium, lithium and aluminum. Such a solution deposist oligodynamic silver on the inner surface of the cups and other containers, while in contact therewith. The active silver is adsorbed on the surfaces of the cups and the containers, and remains thereon after the excess reduced silver compound solution has been drained off. When the cups and containers so treated are filled with water or other liquids, these are sterilized by the adsorbed silver going into solution.

I have also found that the present invention is suitable for treating cellophane for use in cellophane bags or other wrappings to preserve their contents. The cellophane is treated with a dilute solution of an oligodynamic silver compound and a solution of about 15% glycerine. Glycerine serves as a reducing agent and increases thereby the amount of oligodynamic silver adsorbed on the cellophane. Glycerine also serves as a plasticizer to keep the cellophane from becoming brittle. The addition of small amounts of another metallic ion, as, for example, that derived from cupric nitrate, and/or zinc nitrate causes the silver compound to continue to dissolve as oligodynamic silver is removed from solution by the cellophane.

An effective aqueous solution for the treatment of cellophane may contain from .001% to 5.0% silver oxide or silver nitrate, 0.002% to .02% cupric nitrate and 15% glycerine. Polyethylene glycol or any other plasticizer may be substituted for the glycerine.

As noted above, a large variety of cellulosic materials, such as paper, gauze, diapers, cellophane, as well as wood, cleaning tissues, etc., can be effectively treated with the present compositions. The oligodynamic silver solution can also be used for the treatment of glass containers and also in the production of antibacterial paper. Since no plasticizer is required for this type of product, it is possible and often desirable to use reducing agents such as starches, sugars, etc., instead of glycerine or the polyethylene glycols. For instance, in treating cloth, such as shirts, dresses and the like, starch could be used as the reducing agent and a silver compound such as silver oxide could be added to the wheel during the usual starching process in the laundry.

Another effective way to treat cellophane or other materials referred to above is to dip it in aqueous solution containing .03% to .05% silver nitrate and then in a solution containing 15% glycerine and .03% to .05% sodium chloride or cupric chloride. I have found that cellophane oligodynamically prepared with silver nitrate is more effective, more stable, and has less tendency to discolor if the cellophane is first dipped in silver nitrate solution and then in a solution of glycerine and a chloride such as sodium and/or cupric chloride. The two baths are desirable because the silver nitrate appears to be absorbed more readily from aqueous solution without the glycerine or chlorides that are applied in the second bath. The chlorides stabilize the oligodynamic silver and tend to prevent discoloration.

Another method of preparing antibacterial cellulosic material is to dry a dilute solution of the present compositions (e.g., containing .8% silver) on the material. For example, the powder used in the treatment of paraffin-coated containers is prepared by first treating paper fibers with methyl cellulose, drying and then treating with said silver solution, or alternatively by treating the paper fibers alone with the silver solution. The methyl cellulose is used to prevent the cellulose from being wetted by the paraffin and sinking into it. This method has an advantage over that of adsorbing silver from a more dilute solution because there is much less water to evaporate when the treated material is dried.

In some instances, the additional treatment of the material with a chloride, after a treatment with a silver solution of this invention, not only prevents discoloration but stabilizes it to the extent that it can be sterilized at twenty pounds pressure for twenty minutes, without affecting the color or the germicidal activity of the material. This can be accomplished by immersing the material in a chloride solution after said material has been treated with a silver solution used above in the treatment of diapers. In another procedure after applying the silver solutions of this invention to cellulosic fibers, a dilute chloride solution is added and the product is dried.

Treatment of Milk Curd

The silver solutions of the present invention are used to wash milk curd before it is made into cottage cheese. The best solutions for this purpose are those containing between 1.0 to .01 p.p.m. silver. This treatment prolongs the shelf life of the cottage cheese by inhibiting growth of bacteria and fungi.

Treatment of Leather, Animal Hides, Etc.

The following solution is effective in the preservation of animal hides intended for furs and leather:

| | | |
|---|---|---|
| Silver nitrate | gram | 0.07 |
| Cupric nitrate | do | 0.07 |
| Dextrose | do | 0.07 |
| Glycerine | ml | 5.0 |

To 100 mil. with distilled water.

In such cases the reducing agent is desirable but may not be necessary because of the oxidizable compounds, such as fats, oils, etc., that are naturally present in these substances can serve as reducing agents.

WATER TREATMENT

The stock solution A or equivalent or essence thereof, comprising a silver compound solution and a non-volatile, non-metallic, organic reducing agent, when added to swimming or wading pool water in sufficient amounts to give a concentration of 0.2 part to 0.4 part of silver per million parts of water can sterilize the water and prevent algae growth in the pools. Water treated as described and containing 0.2 p.p.m. of silver, removed from the pool and tested in the laboratory, as long as four days after treatment was able to reduce a count of 1,800 *Escherichia coli* per ml. to 3 per ml. in less than five minutes. Spectrographic analyses of painted stones removed from these pools showed that silver was adsorbed on the paint and so could be expected to provide residual germicidal activity after the treatment was stopped.

The stock solution A or equivalent or essence thereof, comprising a silver compound solution and a non-volatile, non-metallic, organic reducing agent when added to the circulating water of cooling towers or air washers of air-conditioning systems in amounts as low as 0.2 part per million, can remove and prevent biological growth which interferes with the efficient operation of such systems.

PLANT TREATMENT

Oligodynamic silver compound solution reduced by a non-volatile, non-metallic, organic reducing agent can be used effectively for the treatment of growing plants, such as tomatoes, salvias, zinnias and chrystanthemums. Concentrations as low as 8.0 parts per million, used as a spray, can control early blight, a fungus infection of tomato plants. Field tests indicate increased growth and healthier plants, when the tomato plants are sprayed with the reduced silver compound solution described or the soil they are grown in is treated with it.

Cut flowers placed in water containing the reduced silver compound solution described or in glass containers treated with it will remain fresh longer and the water remains fresh, clear and odorless for long periods of time.

While the invention has been described with particular reference to specific embodiments, it is to be understood that it is not to be limited thereto, but is to be construed broadly and restricted solely by the scope of the appended claims.

What is claimed is:

1. An oligodynamic silver composition comprising a silver compound capable of yielding ionic silver in solution and a deoxidizing agent capable of reducing said silver compound to silver, said deoxidizing agent being present in sufficient amounts with respect to the silver compound as to reduce said silver compound in dilute solution to oligodynamic silver.

2. A composition according to claim 1, wherein said silver compound is selected from the class consisting of silver oxide and silver nitrate, and said deoxidizing agent is selected from the class consisting of sugars, glycerine, polyethylene glycols and urea.

3. A silver composition containing silver in amounts of from .000001% to 5% by weight, and a non-volatile, non-metallic organic deoxidizing agent selected from the class consisting of sugars, glycerine, urea and polyethylene glycols, the silver being added to said composition in the form of a silver compound selected from the class consisting of silver nitrate and silver oxide, said deoxidizing agent being present in sufficient amounts to reduce said silver compound in dilute solution to soluble oligodynamic silver.

4. A composition according to claim 3, wherein said composition is in an aqueous solution.

5. A composition according to claim 3, wherein said silver is present in an amount of about .04% by weight.

6. A composition according to claim 3, wherein the silver is added in the form of silver nitrate and the deoxidizing agent is dextrose.

7. A composition according to claim 3 including a small quantity of a nitrate material selected from the class consisting of copper nitrate, zinc nitrate and mixtures thereof the amount of metal of said nitrate material present in said composition being no more than twice the amount of silver employed.

8. A composition according to claim 3 acidified with nitric acid.

9. A cellulosic material treated with an aqueous solution of the composition of claim 3.

10. An antiseptic diaper treated with the composition of claim 3.

11. An antiseptic gauze treated with the composition of claim 3.

12. An antiseptic gauze of claim 11 treated further with a 0.2% solution of a salt selected from the class consisting of cupric chloride and sodium chloride.

13. An oligodynamic composition, free from ammonia and ammoniated compounds and from the reaction products of said compounds, containing an oligodynamically active silver solution, said solution consisting of the reaction products of a true aqueous solution of a silver compound of the class consisting of silver oxide and silver nitrate, the concentration of the silver compound in said solution being in the case of silver oxide about .001%, and in the case of silver nitrate from .01% to 5%, and a deoxidizing agent for said compound selected from the class consisting of sugar, glycerine, urea and polyethylene glycol, the quantity of said agent being sufficient at least to reduce substantially all of the silver compound employed, said composition further containing a material selected from the class consisting of copper nitrate, zinc nitrate and mixtures thereof, the quantity of the metal of said material being no more than twice the amount of the silver employed.

14. Antibacterial cellulosic materials treated with compositions described in claim 13.

15. An antiseptic solution comprising a dilute aqueous solution of the composition set forth in claim 13.

16. Antibacterial cellulosic materials treated with compositions described in claim 15.

17. An ointment for burns comprising an ointment base and the composition set forth in claim 13.

18. A composition according to claim 17, wherein said ointment base includes a polyethylene glycol.

19. A composition according to claim 17, wherein the ointment base includes a blend of polyethylene glycols.

20. A composition according to claim 19, wherein the ointment base includes lanolin and beeswax.

21. An oligodynamic composition consisting of oligodynamic active silver in the concentration of .001% to 5%, a source of metal ions selected from the class consisting of cupric ions, zinc ions, and mixtures thereof, in the quantity of no more than twice the amount of the silver, and water.

22. An aqueous antiseptic solution consisting essentially of from .001% to .1% of a silver compound selected from the group consisting of silver oxide and silver nitrate, from 0.002% to .02% cupric nitrate and 15% glycerine, the quantity of copper present being no more than twice the amount of silver in the solution.

23. An aqueous oligodynamic silver stock solution comprising about equal parts by weight of silver nitrate, dextrose, cupric nitrate and zinc nitrate and acidified with nitric acid.

24. An eye wash comprising the stock solution of claim 23 diluted with water and having glycerine added thereto.

25. A process for rendering substances antiseptic, which comprises immersing said substance in a dilute aqueous solution of the composition of claim 1 and subsequently treating said material with chloride ion containing solution.

26. A process for rendering substances antiseptic, which comprises immersing said substance in a dilute aqueous solution of the composition of claim 1 and containing chloride ion, said solution being sufficiently dilute to prevent the precipitation of silver chloride.

27. A process for the treatment of substances to render them antiseptic, which comprises drying an aqueous solution of the composition of claim 1 on the substances treated.

28. A process for the treatment of gauze to make it antibacterial, which comprises treating said gauze with an aqueous solution of the composition of claim 1 and then subjecting the material so treated with a chloride ion containing solution.

29. A process for the treatment of gauze to make it antibacterial which comprises treating said gauze with a dilute aqueous solution of the composition of claim 1 containing chloride ion and being sufficiently dilute to prevent the precipitation of silver chloride, expressing liquid from said gauze and subsequently treating said expressed gauze with chloride ion containing solution.

References Cited in the file of this patent

UNITED STATES PATENTS

| 2,008,131 | Dieck | July 16, 1935 |
| 2,374,754 | Kreidl | May 1, 1945 |
| 2,653,893 | Romans | Sept. 29, 1953 |

FOREIGN PATENTS

| 431,656 | Great Britain | July 12, 1935 |
| 476,376 | Great Britain | Dec. 2, 1937 |